(No Model.) 2 Sheets—Sheet 1.
W. E. HART.
Harvesters.
No. 230,019. Patented July 13, 1880.
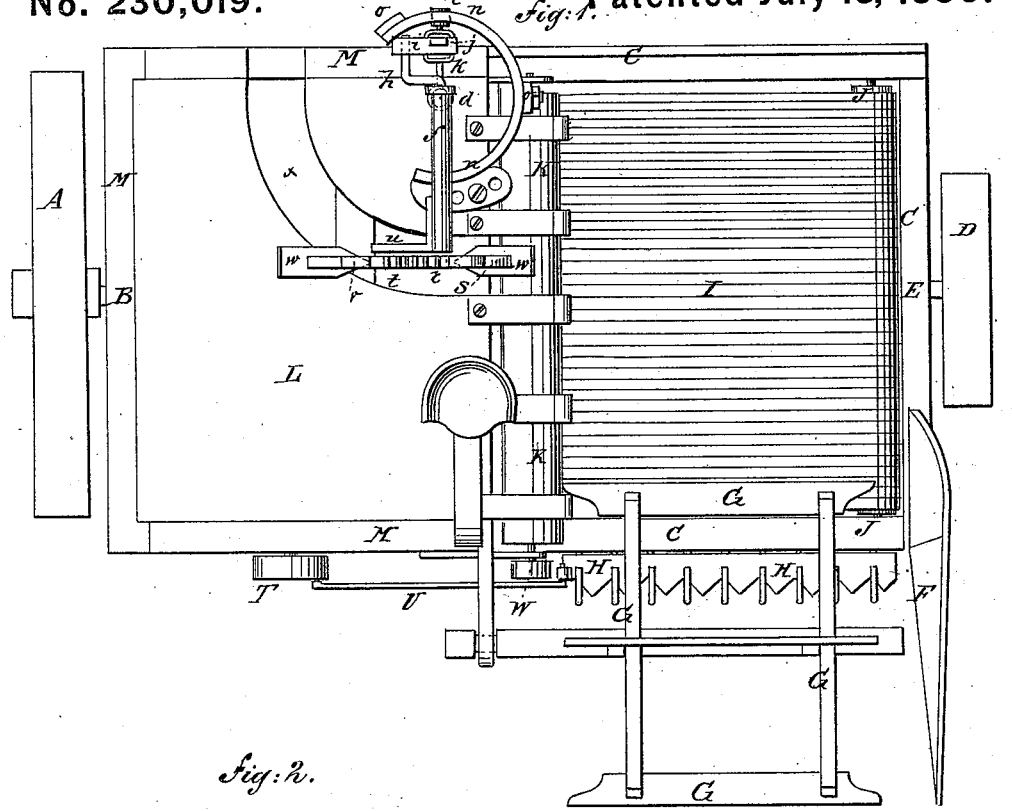
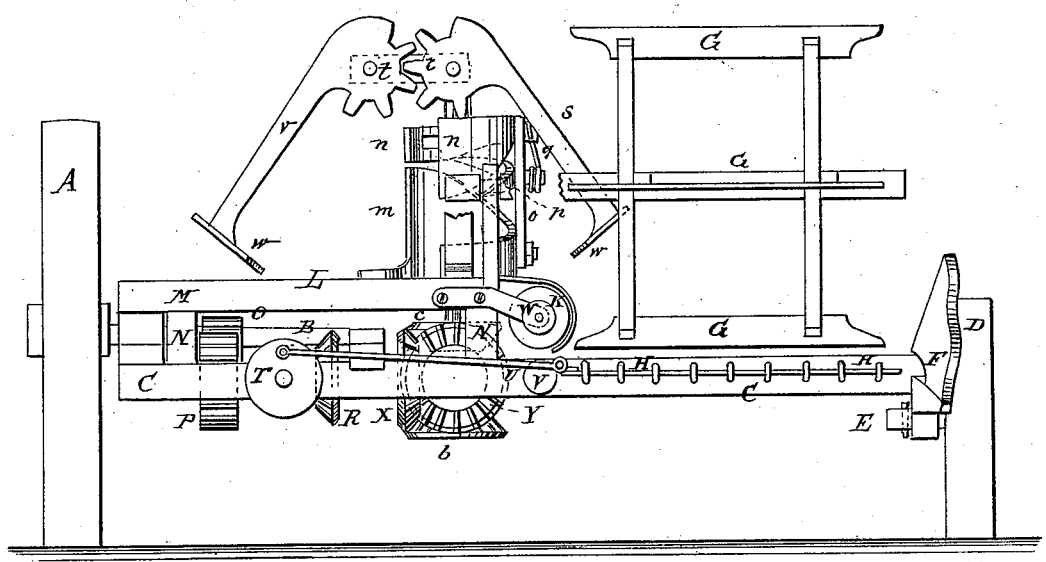
WITNESSES:
Chas. Niela.
C. Sedgwick
INVENTOR:
W. E. Hart
BY Munn & Co.
ATTORNEYS.

(No Model.) 2 Sheets—Sheet 2.
W. E. HART.
Harvesters.
No. 230,019. Patented July 13, 1880.
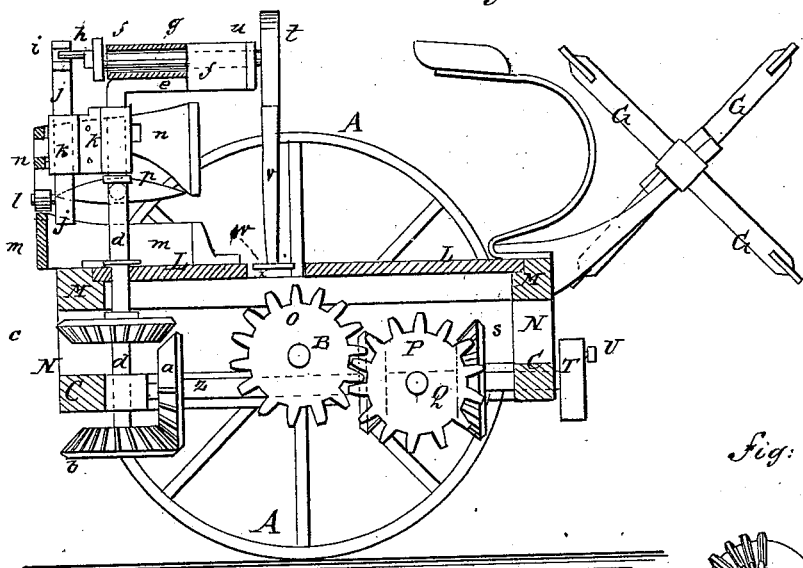
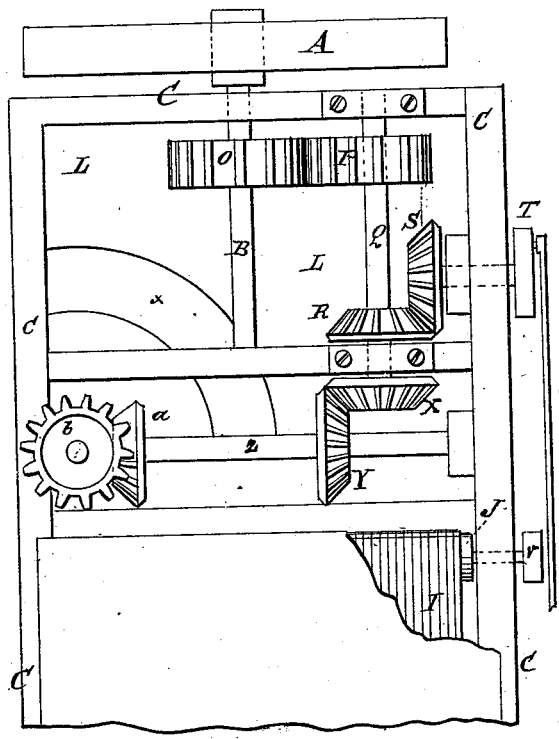
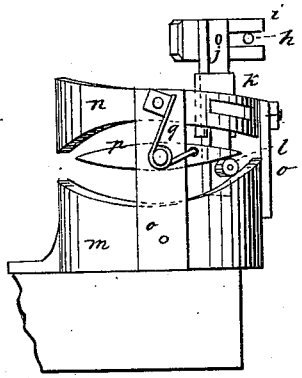
WITNESSES:
Chas. Nida.
C. Sedgwick
INVENTOR:
W. E. Hart
BY Munn & Co
ATTORNEYS.

UNITED STATES PATENT OFFICE.

WILLIAM E. HART, OF CEDAR CITY, MISSOURI, ASSIGNOR TO HIMSELF AND CHARLES W. SAMUEL, OF SAME PLACE.

HARVESTER.

SPECIFICATION forming part of Letters Patent No. 230,019, dated July 13, 1880.

Application filed May 13, 1880. (No model.)

*To all whom it may concern:*

Be it known that I, WILLIAM ELWIN HART, of Cedar City, in the county of Callaway and State of Missouri, have invented a new and useful Improvement in Harvesters, of which the following is a specification.

Figure 1, Sheet 1, is a plan view of the improvement. Fig. 2, Sheet 1, is a front elevation. Fig. 3, Sheet 2, is a sectional side elevation. Fig. 4, Sheet 2, is a bottom view, showing the gearing. Fig. 5, Sheet 2, is a side elevation of the mechanism for controlling the gavel-handling arms. Fig. 6, Sheet 2, is a plan view of the segmental gear-wheel.

Similar letters of reference indicate corresponding parts.

The object of this invention is to furnish harvesters so constructed as to gather the cut grain as it is deposited upon the binding platform into gavels and drop the gavels to the ground at the rear of the machine automatically, and which shall be simple in construction and reliable in operation.

The invention consists in constructing, in a harvester, a mechanism for transferring the gavels from the platform to the ground, of a reciprocating shaft and its driving-gearing, the arm, the crank-shaft, the sliding upright having a slotted cross-head and a pin, the semi-cylindrical plates having an elliptical aperture between their adjacent edges, the elliptical guide-plate and its spring, and the segmental gear-wheels and their arms, whereby the gavels are taken from the platform and dropped to the ground, as will be hereinafter fully described.

A is the drive-wheel, which is attached to the axle B, so as to carry the said axle with it in its revolution.

The axle B revolves in bearings attached to the frame C, which is formed of four bars framed to each other at their ends. The other end of the frame C is supported by the small wheel D, the journal E of which revolves in bearings attached to the said frame C. The machine is provided with a divider, F, a reel, G, and a cutter-bar, H, in the ordinary manner.

As the grain is cut it falls upon the endless apron I, which passes around rollers J, pivoted to the frame C, and connected with the driving mechanism by suitable gearing. From the endless apron I the cut grain is carried by the elevator K to and delivered upon the binders' platform L, the frame M of which is attached to the upper ends of the short posts N.

The lower ends of the posts N are framed into the bars of the frame C, so that the binders' platform L will give greater strength and firmness to the main frame C of the harvester.

To the axle B is attached a gear-wheel, O, the teeth of which mesh into the teeth of a gear-wheel, P, attached to a short countershaft, Q, placed parallel with the axle B.

The shaft Q revolves in bearings attached to the frame C, and to it is attached a bevel-gear wheel, R, the teeth of which mesh into the teeth of a bevel-gear wheel, S.

The journal of the bevel-gear wheel S works in bearings attached to the frame C, and to its outer end is attached a crank-wheel, T, to the crank-pin of which is pivoted the end of the pitman U, that operates the cutter-bar H. The crank-wheel T also serves as a pulley to receive a band, which also passes around a pulley, V, attached to the forward end of the inner roller, J, of the endless apron I.

To the forward end of the roller or shaft of the elevator K is attached a pulley, W, to receive a band which passes around the pulley V or T for driving the said elevator K.

To the inner end of the counter-shaft Q is attached a bevel-gear wheel, X, the teeth of which mesh into the teeth of the bevel-gear wheel Y, attached to the shaft Z.

The shaft Z is placed at right angles with the axle B, revolves in bearings attached to the frame C, and to it is attached a segmental bevel-gear wheel, *a*, the teeth of which mesh alternately into the teeth of the bevel-gear wheels *b c*, attached to the same shaft *d*, the one above and the other below the shaft Z.

The shaft *d* revolves in bearings attached to the frame C, and is placed at the end of and in the same vertical plane with the shaft Z.

The shaft *d* has a horizontal arm, *e*, formed upon or attached to it at a suitable distance from the platform L, to which is attached a long bearing, *f*.

In the bearing *f* revolves a shaft, *g*, having a crank, *h*, formed upon or attached to its inner end, which crank $h$ works in a slot in the end of the cross-head or bar $i$, attached to or formed upon the upper end of the upright bar $j$.

The upright bar $j$ slides up and down in a bearing, $k$, rigidly attached to the upper part of the shaft $d$.

To the lower end of the upright bar $j$ is attached a pin, $l$, provided with a friction-roller, which pin projects into an elliptical aperture between semi-cylindrical plates $m$ $n$. The plate $m$ is secured at its lower edge to the platform L, and the plate $n$ is secured to bars $o$, attached to the plate $m$. The plate $n$ is slotted to receive the bolts that secure it to the bars $o$, so that it may be adjusted as required.

To the bar $o$, attached to the middle part of the plates $m$ $n$, is pivoted an elliptical plate, $p$, to serve as a guide to direct the pin $l$ and cause it to pass alternately along the adjacent edges of the plates $m$ $n$.

With the bar $o$ and the guide-plate $p$ is connected a spring, $q$, so arranged as to hold the rear end of the guide-plate $p$ pressed down against the edge of the lower plate, $m$. With this construction the pin $l$, in passing forward from the rear end of the aperture between the plates $m$ $n$, will pass above the guide-plate $p$, and in passing back from the forward end of the said aperture will pass below the guide-plate $p$, raising its rear end and passing beneath it, the said rear end being forced down by the spring $q$ as soon as the said pin has passed, so that the said pin must pass forward above the said guide-plate. With this construction the movement of the pin $l$ will give an up-and-down movement to the upright bar $j$, causing its cross-head $i$ to rock the crank-shaft $g$. To the other end of the crank-shaft $g$ is attached a segmental gear-wheel, $r$, to which is rigidly attached a downwardly-projecting arm, $s$.

The teeth of the segmental gear-wheel $r$ mesh into the teeth of a segmental gear-wheel, $t$, pivoted to a bracket, $u$, attached to the bearing $f$, in which the crank-shaft $g$ works. To the segmental gear-wheel $t$ is attached a downwardly-projecting arm, $v$.

To the lower end of one or both the arms $s$ $v$ are attached plates $w$, to pass beneath the gavel and support it while being carried. With this construction the reciprocating movement of the shaft $d$ swings the arms $s$ $v$ back and forth over the binders' platform L, the rocking of the shaft $g$ causing the arms $s$ $v$ to open as they move forward, and to close and grasp the gavel as they move to the rearward, the said arms opening and dropping the gavel to the ground at the rear end of the machine. The gavel may be bound while it is grasped by the arms $s$ $v$, or after it has been dropped to the ground, as may be desired. A curved groove or slot, $x$, is formed in the platform L for the lower ends of the arms $s$ $v$ to move through while grasping the gavel, so that the gavel may be carried along the surface of the said platform L.

Having thus fully described my invention, I claim as new and desire to secure by Letters Patent—

1. In a harvester, the mechanism for transferring the gavels, constructed substantially as herein shown and described, consisting of the reciprocating shaft $d$ and its driving-gearing, the arm $e$, the crank-shaft $g$, the sliding upright $j$, having slotted cross-head $i$ and pin $l$, the semi-cylindrical plates $m$ $n$, having an elliptical opening between their adjacent edges, the elliptical pivoted guide-plate $p$ and its spring $q$, the segmental gear-wheels $r$ $t$, and their arms $s$ $v$, whereby the gavel is taken from the platform and dropped to the ground, as set forth.

2. In a harvester, the combination, with the drive-wheel axle B, the gear-wheels O P, and the counter-shaft Q, of the bevel-gear wheels $x$ $y$ $b$ $c$, the segmental gear $a$, the horizontal shaft Z, the upright shaft $d$, having arm $e$ and bearings $f$ $k$, the crank-shaft $g$, the sliding upright $j$, having slotted cross-head $i$, and pin $l$, the semi-cylindrical plates $m$ $n$, having elliptical opening between their adjacent edges, the elliptical pivoted guide-plate $p$, having spring $q$, the segmental gear-wheels $r$ $t$, and their arms $s$ $v$, substantially as herein shown and described, whereby the gavel is taken from the platform L and dropped to the ground, as set forth.

3. In a harvester, the combination, with the upright shaft $d$ and the sliding upright bar $j$, having pin $l$, of the semi-cylindrical plates $m$ $n$, having an elliptical aperture between their adjacent edges, and the elliptical pivoted guide-plate $p$ and its spring $q$, substantially as herein shown and described, whereby the bar $j$ receives a vertical sliding movement from the reciprocating rotary movement of the shaft $d$, as set forth.

4. In a harvester, the combination, with the partially-rotating upright shaft $d$, having arm $e$, and the vertical sliding bar $j$, having slotted cross-head $i$, of the crank-shaft $g$, the segmental gear $r$ $t$, and the arms $s$ $v$, substantially as herein shown and described, whereby the arms $s$ $v$ are opened and closed as they are swung back and forth by the reciprocating movement of the shaft $d$, as set forth.

WILLIAM ELWIN HART.

Witnesses:
R. V. KENNEY,
JOSHUA BURDETT.